BEST AVAILABLE COPY
DRAPER & GLOVER.
Fire Proof Safe.
No. 3,298. Reissued Feb. 16, 1869.
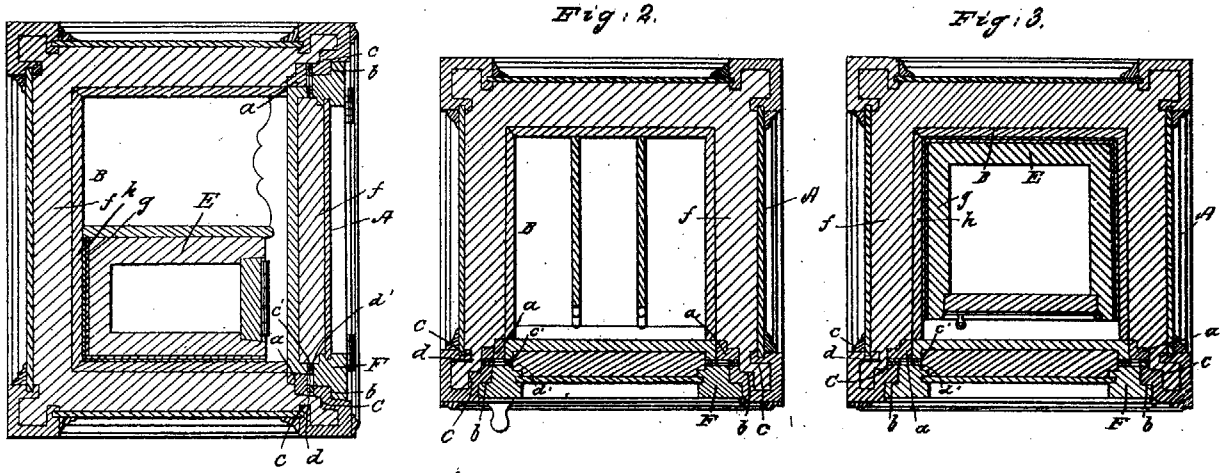
Witnesses:
S. S. Pifer
Lainitz Noller
Inventors:
E. D. Draper
and
E. W. Glover
by their Attorney:
R. H. Eddy
N. PETERS, Photo-Lithographer, Washington, D. C.

UNITED STATES PATENT OFFICE.

EBENEZER D. DRAPER, OF HOPEDALE, AND EDWARD W. GLOVER, OF MEDFORD, MASSACHUSETTS.

IMPROVEMENT IN FIRE-PROOF SAFE.

Specification forming part of Letters Patent No. 73,309, dated January 14, 1868; reissue No. 3,298, dated February 16, 1869.

*To all whom it may concern:*

Be it known that we, EBENEZER D. DRAPER, of Hopedale, in the county of Worcester, and EDWARD W. GLOVER, of Medford, in the county of Middlesex and State of Massachusetts, have made a new and useful invention having reference to Fire-Proof Safes; and we do hereby declare the same to be fully described in the following specification, and represented in the accompanying drawings, of which—

Figure 1 is a vertical section, and Figs. 2 and 3 are horizontal sections, of a safe provided with our invention.

The nature of our invention consists in introducing into the edges and jambs of the doors of safes grooves or air-spaces for the purpose of arresting the conduction of heat to the interior of the safe along the door edges and jambs, by breaking the continuity of their metallic surfaces by the interposition of a non-conductor. It further consists in filling said grooves, when preferred, with the material or materials hereinafter specified, which, while affording, in the ordinary condition of the safe, a good finish to the door jambs and edges, will, when the safe is subjected to heat, by partially or wholly escaping, leave the protective efficiency of the groove wholly unaffected, all as hereinafter more fully set forth.

In the drawings, A denotes the outer case of the safe as formed of plate-iron. B is the inner case, which may be either of wood or iron. C C are the jambs or frames of the door-opening. E is an inner safe or iron box, usually made of steel, and termed a "Burglar-Proof." F is the door, hinged to one of the jambs in the ordinary way. We have found that, when a safe is exposed in a fire, the heat and flame are more liable to gain access to the interior through and about the joints and jambs of the door than in any other portion or parts of the safe, the jambs being a means of conducting the heat from the external to the internal casing. The main object of our invention is to prevent this passage of heat through the jambs and door; and for this purpose we insert within the jambs a stratum of mica or its equivalent, and also a stratum of fusible metal. We also insert in the door-frame such stratums of mica and fusible metal.

In carrying out our invention we form the jambs in two separate frames or parts, *a b*, with an air space or groove, *s*, between the two, so that one shall be insulated from the other. In this groove we place a strip or stratum, *c*, of mica and a stratum, *d*, of lead or fusible metal. In other words, we insulate one-half or portion of each of the jambs from the rest of it by means of one or more plates or stratums of mica and fusible metal placed between the two, and reaching to the heat-resisting stuffing of the safe. The door we also form with an air space or groove, *t*, extending around or within that part of its edge or those portions of its edges encompassed by the jambs aforesaid when the door is closed. This insulating groove or space in the door is to operate as a means of cutting off the passage of heat through the edges of the door; or, in other words, to insulate the front and rear metallic portions of the door, the insulating-groove extending into the hollow space within the doors, or that in which the stuffing or filling *f* is placed. Within the said groove or space *t* of the door, when the front and rear portions, between which the space *t* is situated, are suitably connected by bolts, or otherwise, we place the insulating matter or materials, which may consist of one or more plates or stratums of mica and fusible metal. The mica in the door is shown at *c'* and the fusible metal at *d'*. The stratum of fusible metal is laid alongside of the stratum of mica, and should be a metal or composition which will melt at a temperature of about 212° Fahrenheit. The stuffing or filling of the door, and between the outer and inner cases of the body of the safe, is shown at *f*. The purpose of the fusible metal is to melt when the temperature may reach 212° Fahrenheit, or thereabout; and, by running out of the space or spaces containing it, leave it or them open or containing air, which may operate as an additional means of preventing the heat from passing from one part of the jamb or door to the other part. The mica may be employed without the fusible metal, but we prefer to use the latter on account of making a better finish with it, and of its being advantageous in other respects. We also insulate the burglar-proof or inner safe from the outer one by a stratum of mica, or stratums of mica and fusible metal, arranged between its external surfaces and the adjacent internal surfaces of the inner case of the safe, the same being as shown at *g* and *h*, the mica being exhibited at *g* and the fusible metal at *h*.

In order to make room for the insulation about the sides or outer surface of the burglar-proof, there should be a narrow space, *u*, arranged between the inner wall of the safe and the surface or portions of the burglar-proof to be insulated, or against which the insulating material or matter is to be arranged.

Air is an insulating medium; but in place thereof, in the insulating grooves or spaces, we generally employ the mica or other suitable insulator, or the same and fusible metal.

We cut off or break the passage of heat into the safe by means of air spaces or grooves, as described, or by the same and a material which is a very slow conductor of heat, and almost, if not entirely, indestructible by heat, and thus we overcome the difficulties to which most iron safes are liable, viz., the passage of heat through the door-frame and the jambs, or those parts which are not insulated by the cement or fire-proof lining, felting, or stuffing.

We are aware that in the construction of a safe a lining of soap-stone has been arranged between the internal and external plates, both of the safe and the door; also, that the door has been made of a plate of iron lined with soap-stone, and that the jambs of the door-opening have been made of soap-stone. We do not claim such, as our invention differs materially therefrom, and has reference more particularly to safes made with metallic jambs, and with doors chambered, and containing a filling or stuffing of cement.

We make no claim to a safe made as represented in the United States Patent No. 19,923, in which there is an air-space between its two doors, and extending around the sides of the inner chest, and between such and the outer case or chest, such space being for the insulation of one door from the other, and the inner from the outer of the two chests.

We apply or arrange an insulating-groove or air-space within the edge or edges of the narrow stuffing box or chamber of the door, so as to prevent the heat from passing through such edge or edges from the front to the back plate of the stuffing-chamber of the door, such part of our invention having special reference to a boxed or chambered door for a safe, and not to two separate doors with an air-space between them.

What, therefore, we claim as our invention or improvement in a safe is—

1. The combination and arrangement of a heat non-conductor, *c*, of mica or its equivalent, with each or either of the metallic jambs or sides of the door-frame, and the filling thereof, the whole being substantially as and for the purpose specified.

2. The combination and arrangement of one or more stratums of fusible metal, *d*, with the mica heat non-conductor *c*, arranged in a safe, substantially in manner and for the purpose specified.

3. The combination and arrangement of mica or its equivalent, or of mica and fusible metal, with the sides of the burglar-proof and the next adjacent internal surfaces of the safe, the whole being substantially as specified.

4. In a safe, the construction of either or all of its jambs for reception of the door, with an insulating groove or space, *s*, arranged therein, so as to insulate or aid in insulating from each other the portions *a b* of the jambs, the said space being adapted for the reception of one or more insulating mediums, as set forth.

5. In a safe, the boxed or chambered door, as constructed with an insulating groove or space, *t*, arranged in its edge or edges, and to extend outside of the filling or stuffing, or the chamber to contain the same, the said space *t* being adapted or intended for the reception of one or more insulating mediums, or the same and a fusible metal, as set forth.

6. In a safe, the arrangement of an insulating-space directly around the burglar-proof, or between it and any side of it and the next adjacent inner wall of the safe, such space being designed or adapted for the reception of an insulating medium or slow conductor of heat, or the same and a fusible metal or composition which will melt at a low temperature, as explained.

EBENEZER D. DRAPER.
EDWARD W. GLOVER.

Witnesses:
R. H. EDDY,
F. P. HALE, Jr.